(12) United States Patent
Kawato

(10) Patent No.: US 10,135,672 B2
(45) Date of Patent: Nov. 20, 2018

(54) LOG DATA COLLECTION SYSTEM, TERMINAL DEVICE, AND LOG DATA COLLECTION METHOD

(71) Applicant: NEC Corporation, Tokyo (JP)

(72) Inventor: Masahiro Kawato, Tokyo (JP)

(73) Assignee: NEC Corporation, Tokyo (JP)

( * ) Notice: Subject to any disclaimer, the term of this patent is extended or adjusted under 35 U.S.C. 154(b) by 146 days.

(21) Appl. No.: 15/111,428

(22) PCT Filed: Sep. 17, 2014

(86) PCT No.: PCT/JP2014/004762
§ 371 (c)(1),
(2) Date: Jul. 13, 2016

(87) PCT Pub. No.: WO2015/107574
PCT Pub. Date: Jul. 23, 2015

(65) Prior Publication Data
US 2016/0337167 A1 Nov. 17, 2016

(30) Foreign Application Priority Data
Jan. 15, 2014 (JP) .................. 2014-004920

(51) Int. Cl.
*G06F 15/173* (2006.01)
*H04L 12/24* (2006.01)
(Continued)

(52) U.S. Cl.
CPC ........... *H04L 41/069* (2013.01); *H04L 67/06* (2013.01); *G06F 11/3476* (2013.01); *H04L 67/325* (2013.01)

(58) Field of Classification Search
None
See application file for complete search history.

(56) References Cited

U.S. PATENT DOCUMENTS 8,903,458 B1 * 12/2014 Ho .................. H04W 52/0261
455/572
2002/0172219 A1 * 11/2002 Lu .................... H04L 12/413
370/451
(Continued)

FOREIGN PATENT DOCUMENTS

JP 2000-029743 A 1/2000
JP 2001-306511 A 11/2001
(Continued)

OTHER PUBLICATIONS

International Search Report corresponding to PCT/JP2014/004762, dated Dec. 2, 2014, 1 page.

*Primary Examiner* — Younes Naji
(74) *Attorney, Agent, or Firm* — Wilmer Cutler Pickering Hale and Dorr LLP

(57) ABSTRACT

A log data collection system includes a terminal device accumulating log data; and a collection device collecting the log data from the terminal device through a network, wherein the terminal device includes transmission determination unit which determines a timing of transmitting the log data to the collection device, within a permissible transmission period, being a time span in which transmission of the log data is permitted, based on a state of the terminal device, a state of the network, and a remaining time of the permissible transmission period.

9 Claims, 11 Drawing Sheets

(51) Int. Cl.
*H04L 29/08* (2006.01)
*G06F 11/34* (2006.01)

(56) References Cited

U.S. PATENT DOCUMENTS

| | | | | |
|---|---|---|---|---|
| 2003/0198229 A1* | 10/2003 | Ochi | ................ | H04L 12/2854 |
| | | | | 370/395.4 |
| 2004/0133448 A1* | 7/2004 | Higashi | ................ | G06F 21/10 |
| | | | | 726/30 |
| 2008/0100873 A1 | 5/2008 | Ohtsu | | |
| 2011/0029664 A1* | 2/2011 | Harrang | ................ | H04L 1/0002 |
| | | | | 709/224 |
| 2014/0181257 A1* | 6/2014 | Sridhar | ................ | H04W 4/029 |
| | | | | 709/219 |

FOREIGN PATENT DOCUMENTS

| | | |
|---|---|---|
| JP | 2002-259236 A | 9/2002 |
| JP | 2008-113266 A | 5/2008 |
| JP | 2008-217118 A | 9/2008 |
| JP | 2012-118876 A | 6/2012 |

* cited by examiner

Fig. 6

| t | 0 | 1 | 2 | 3 | 4 | 5 | TOTAL |
|---|---|---|---|---|---|---|---|
| PERMISSIBLE TRAFFIC Tmax [t] | 50 | 40 | 20 | 0 | 40 | 50 | 200 |
| LOG TRANSMISSION PROBABILITY P [t] | 0.25 | 0.2 | 0.1 | 0 | 0.2 | 0.25 | 1 |
| PERMISSIBLE LOG TRANSMISSION COUNT N [t] | 2 | 2 | 1 | 0 | 2 | 3 | 10 |
| TERMINAL DEVICE ALLOCATION | D1, D2 | D3, D4 | D5 | | D6, D7 | D8, D9, D10 | |

LOG DATA COLLECTION SYSTEM, TERMINAL DEVICE, AND LOG DATA COLLECTION METHOD

CROSS-REFERENCE TO RELATED APPLICATION

This application is a national stage application of International Application No. PCT/JP2014/004762 entitled "LOG DATA COLLECTION SYSTEM, TERMINAL DEVICE, AND LOG DATA COLLECTION METHOD," filed on Sep. 17, 2014, which claims the benefit of the priority of Japanese Patent Application No. 2014-004920 filed on Jan. 15, 2014, the disclosures of each of which are hereby incorporated by reference in their entirety.

TECHNICAL FIELD

The present invention relates to a log data collection system, a terminal device, a log data collection method, and a program, and more particularly relates to a log data collection system, a terminal device, a log data collection method, and a program, for collecting log data accumulated in a terminal device.

BACKGROUND ART

A log data collection system is a system aggregating log data, with respect to a plurality of terminal devices, into a log collection server, by periodically transmitting log data accumulated in a terminal device, such as positional information and a usage history of an application, from the terminal device to the log collection server. Examples of technologies related to a log data collection system are disclosed in PTL 1, 2, and 3.

In PTL 1, components corresponding to the terminal device and the log collection server are respectively described by the names of an agent terminal device and an administrative server device. In a log data collection system presented in PTL 1, an administrative server device delivers a log collection schedule to an agent terminal device. Then, the agent terminal device transmits obtained log data to the administrative server device at a time specified in the delivered log collection schedule.

In PTL 2, components corresponding to the terminal device and the log collection server are respectively described by the names of a distributed device and a central device. An object of a log data collection system presented in PTL 2 is to collect log data with high frequency, when some anomaly occurs in a distributed device. Furthermore, loads on a distributed device and a central device are periodically monitored, and collected at a time of a low load.

In PTL 3, components corresponding to the terminal device and the log collection server are respectively described by the names of a client and a server. Further, machine information collection is targeted as processing corresponding to log collection. A machine information collection system presented in PTL 3 includes a method of collecting machine information, in accordance with a schedule delivered from a server to a client, and a method of starting machine information collection only at a time of a low client machine load. Thus, it is realized that a machine load and a network load, accompanying machine information collection, are distributed.

CITATION LIST

Patent Literature

PTL 1: Japanese Unexamined Patent Application Publication No. 2008-217118
PTL 2: Japanese Unexamined Patent Application Publication No. 2002-259236
PTL 3: Japanese Unexamined Patent Application Publication No. 2001-306511

SUMMARY OF INVENTION

Technical Problem

When periodically collecting log data composed of positional information, an application usage history, and the like, through a wireless network such as wideband code division multiple access (W-CDMA) and long term evolution (LTE), there is a problem that network traffic generated in log data collection may cause occurrence of congestion.

Occurrence of congestion accompanying log data transmission has following causes.
(1) Effect of background traffic (communication traffic unrelated to log data collection): A total amount of background traffic and log data collection traffic by log data collection represents an entire amount of communication traffic. Therefore, even when a proportion of log data collection traffic in communication traffic is low, transmission/reception of log data may trigger occurrence of congestion, depending on a background traffic situation.
FIG. 9 is a diagram illustrating an example of background traffic and log data collection traffic. The example illustrates a situation that background traffic TR1 is maximum around 12:00 and log data collection traffic alone is nearly constant throughout 24 hours. In such a situation, entire communication traffic TR2 increases or decreases with fluctuation of the background traffic TR1, and therefore congestion CN may occur at a peak time.
(2) Effect of wireless state transition of a terminal device: Depending on a state of a terminal device at a timing of transmitting log data from the terminal device, excessive communication traffic may occur.
In a wireless network such as W-CDMA and LTE, states such as an active state and an idle state exist between a terminal device and a base station (specific state names and a number of states vary in accordance with wireless network standard). Typically, data transmission/reception is performed in the active state, and the idle state is used in other situations to suppress consumption of a wireless resource and power.
Consequently, depending on a wireless state RFST when attempting to send log data from a terminal device to a server, following differences of (A) and (B) occur (refer to FIG. 10).
(A) When a terminal device is in the idle state: Log data are transmitted after transitioning from the idle state to the active state (ST). Communication traffic by transmission/reception of a control signal required for the state transition ST is generated.
(B) When the terminal device is in the active state: Log data are transmitted from the terminal device to the server without accompanying state transition.
Therefore, when log data are transmitted without considering the wireless state RFST of the terminal device, in a case of the state (A), excessive communication traffic may be generated.

In a method of transmitting log data only when a terminal device is in a good state, as described in PTL 2 and 3, when a high load state in a network or a terminal device continues, log data transmission is repeatedly put on hold. Consequently, delay in log data transmission is generated, and log data cannot be collected at a timing expected by an application using the log data. Therefore, the problem described above cannot be solved.

The present invention is made to solve such a problem, and an object thereof is to provide a log data collection system, a terminal device, a log data collection method, and a program, providing collection of log data within a transmission time limit, while leveling out a network load accompanying the collection.

Solution to Problem

A log data collection system according to a first aspect of the invention includes:
a terminal device accumulating log data; and
a collection device collecting the log data from the terminal device through a network, wherein
the terminal device includes transmission determination unit which determines a timing of transmitting the log data to the collection device, within a permissible transmission period, being a time span in which transmission of the log data is permitted, based on a state of the terminal device, a state of the network, and a remaining time of the permissible transmission period.

A terminal device according to a second aspect of the present invention includes:
a storage unit storing log data and a permissible transmission period, being a time span in which transmission of the log data is permitted; and
a transmission determination unit determining a timing of transmitting the log data to a collection device connected through the network, within the permissible transmission period, based on an own state, a state of the network, and a remaining time of the permissible transmission period.

A log data collection method according to a third aspect of the present invention
is a log data collection method for collecting log data by use of a terminal device accumulating the log data and a collection device connected to the terminal device through a network, wherein,
the method includes, by the terminal device,
determining a timing of transmitting the log data, within a permissible transmission period, being a time span in which transmission of the log data is permitted, based on a state of the terminal device, a state of the network, and a remaining time of the permissible transmission period, and
transmitting the log data to the collection device at the determined timing.

A non-transitory computer readable medium storing a program according to a fourth aspect of the present invention causes a computer to perform:
transmission determination processing of determining a timing of transmitting log data, within a permissible transmission period, being a time span in which transmission of the log data, accumulated locally, is permitted, based on an own state, a state of the network, and a remaining time of the permissible transmission period; and
transmission processing of transmitting the log data to a collection device connected through the network at the determined timing.

Advantageous Effects of Invention

The present invention is able to provide a log data collection system, a terminal device, a log data collection method, and a program, for providing collection of log data within a transmission time limit, while leveling out a network load accompanying the collection.

BRIEF DESCRIPTION OF DRAWINGS

FIG. 6 is a diagram illustrating an example of a calculation process of a permissible log transmission count according to the exemplary embodiment 2 of the present invention.

DESCRIPTION OF EMBODIMENTS

Specific exemplary embodiments applying the present invention will be described in detail below with reference to the drawings. In the respective drawings, a same reference sign is given to a same component, and overlapping description is omitted as appropriate, for clarification of description.
<Exemplary Embodiment 1>

Figure 1:
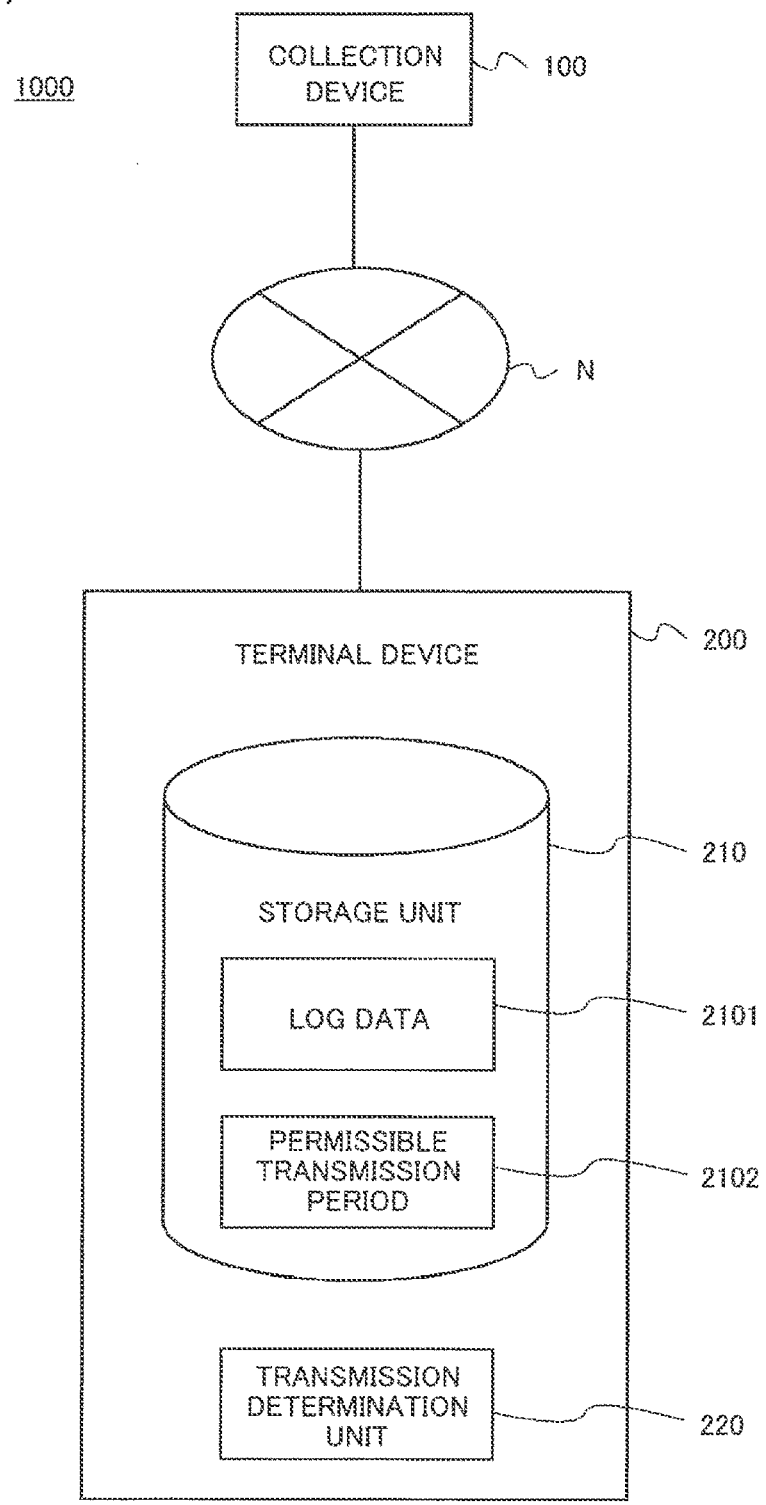
FIG. 1 is a block diagram illustrating an overall configuration of a log data collection system according to an exemplary embodiment 1 of the present invention.

FIG. 1 is a block diagram illustrating an overall configuration of a log data collection system 1000 according to an exemplary embodiment 1 of the present invention. The log data collection system 1000 includes a terminal device 200 accumulating log data, and a collection device 100 collecting log data from the terminal device 200 through a network N.

The terminal device 200 includes at least a storage unit 210 and a transmission determination unit 220. The storage unit 210 stores log data 2101 and a permissible transmission period 2102. The log data 2101 includes positional information of the terminal device 200, an operation history by a user of the terminal device 200, and a state of an application. The permissible transmission period 2102 is a time span in which transmission of the log data 2101 is permitted. In other words, the permissible transmission period 2102 is a time span defined by a start time and a finish time. The permissible transmission period 2102 may be specified by either of a collector of the log data 2101 and a user. Further, the permissible transmission period 2102 may be determined based on a communication traffic history of the network N. Further, the communication traffic history of the network N refers to, for example, the aforementioned communication traffic, and is a total amount of the background traffic and the log data collection traffic, described above, or includes at least the background traffic.

The transmission determination unit 220 is an example of a transmission determination unit, and determines a timing of transmitting the log data 2101 to the collection device 100, within the permissible transmission period 2102, based on a state of the terminal device 200, a state of the network N, and a remaining time of the permissible transmission period 2102. The state of the terminal device 200 includes, for example, a type of a connection line through which the terminal device 200 is connected to the network N at a present time, and a state of establishment of a connection with the network N. The state of the network N includes, for example, communication traffic at the present time. The remaining time of the permissible transmission period 2102 represents a remaining time from the present time to a finish time.

Figure 2:
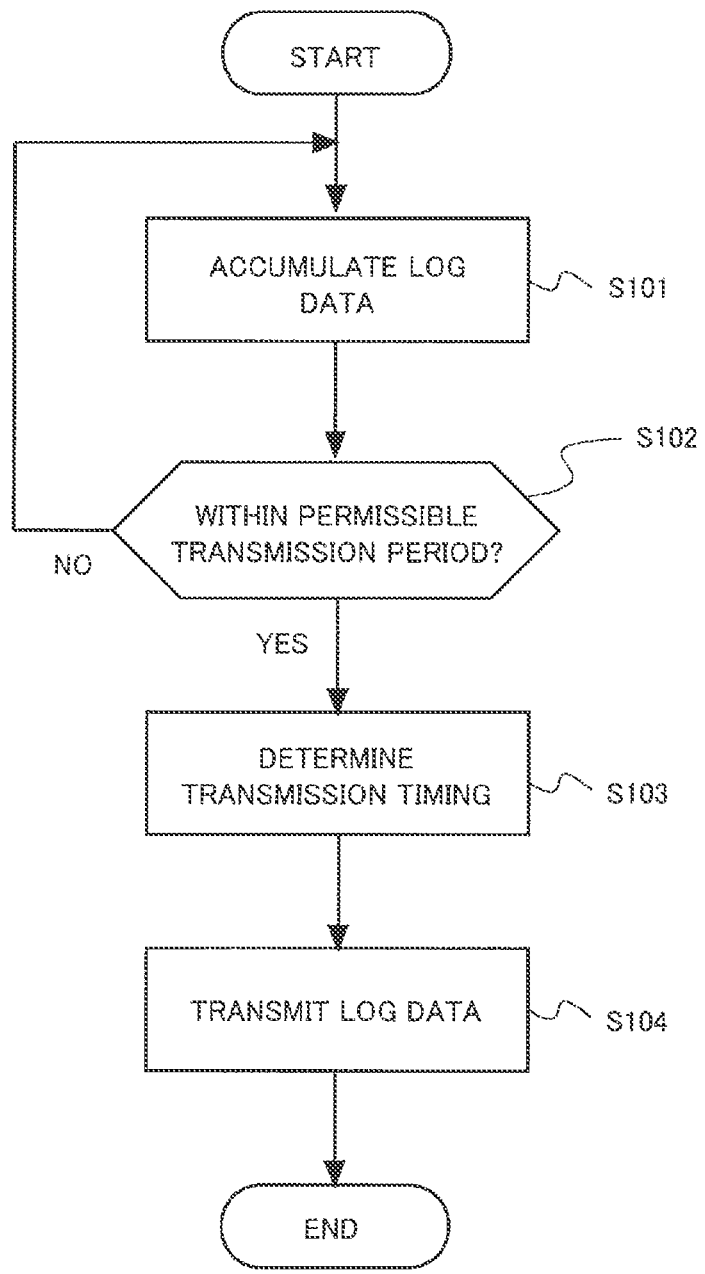
FIG. 2 is a flowchart illustrating a flow of a log data collection method according to the exemplary embodiment 1 of the present invention.

FIG. 2 is a flowchart illustrating a flow of a log data collection method according to the exemplary embodiment 1 of the present invention. First, the terminal device 200 appropriately accumulates the log data 2101 in the storage unit 210 during normal operation (S101). Next, the terminal device 200 refers to the storage unit 210 to determine whether or not a present time is within the permissible transmission period 2102 (S102). The terminal device 200 returns to Step S101 when the present time exists out of the permissible transmission period, and proceeds to Step S103 when the present time exists within the permissible transmission period.

Next, the transmission determination unit 220 determines a transmission timing (S103). Specifically, the transmission determination unit 220 determines a timing of transmitting the log data 2101 to the collection device 100, based on a state of the terminal device 200, a state of the network N, and a remaining time of the permissible transmission period 2102. Subsequently, the terminal device 200 transmits the log data 2101 to the collection device 100 at the determined timing.

Thus, the exemplary embodiment 1 of the present invention is able to provide collection of log data within a transmission time limit, while leveling out a network load accompanying the collection. The reason is that, first, a transmission timing of log data is determined within a permissible transmission period in which transmission of the log data is permitted based on a communication traffic history of the network N. In other words, a permissible transmission period, being a theoretically proper transmission timing with a certain range (a start time and a finish time), is used in consideration of a past network load (communication traffic). Then, when the log data is actually transmitted, a fine adjustment of the proper timing, depending on a situation at the time, is required, and therefore a timing under a lower load may be determined, in consideration of a state of the terminal device 200 and a state of the network N, at a certain point within the permissible transmission period. There is a concern that, by simply considering a state as of transmission, transmission of the log data may continue to be deferred as is the case with PTL 2 and the like, and therefore, by ensuring determination of the transmission timing within the permissible transmission period, the transmission time limit can be reliably observed.

<Exemplary Embodiment 2>

An exemplary embodiment 2 of the present invention is an application example of the exemplary embodiment 1 described above. Specifically, it is desirable that, in the permissible transmission period, the transmission determination unit determines a timing of transmitting the log data to the collection device, by giving higher priority to communication of data other than the log data, through the network, as a present time is closer to a start time of the permissible transmission period, and giving higher priority to transmission of the log data to the collection device, as the present time is closer to a finish time of the permissible transmission period. Thus, log data are transmitted early when there is a margin for a network load, and, by contrast, in the event that a high network load continues, transmission of log data is given higher priority than other communications, and therefore a constraint of a transmission time limit can be observed in consideration of a load in the network and the like.

Figure 3:
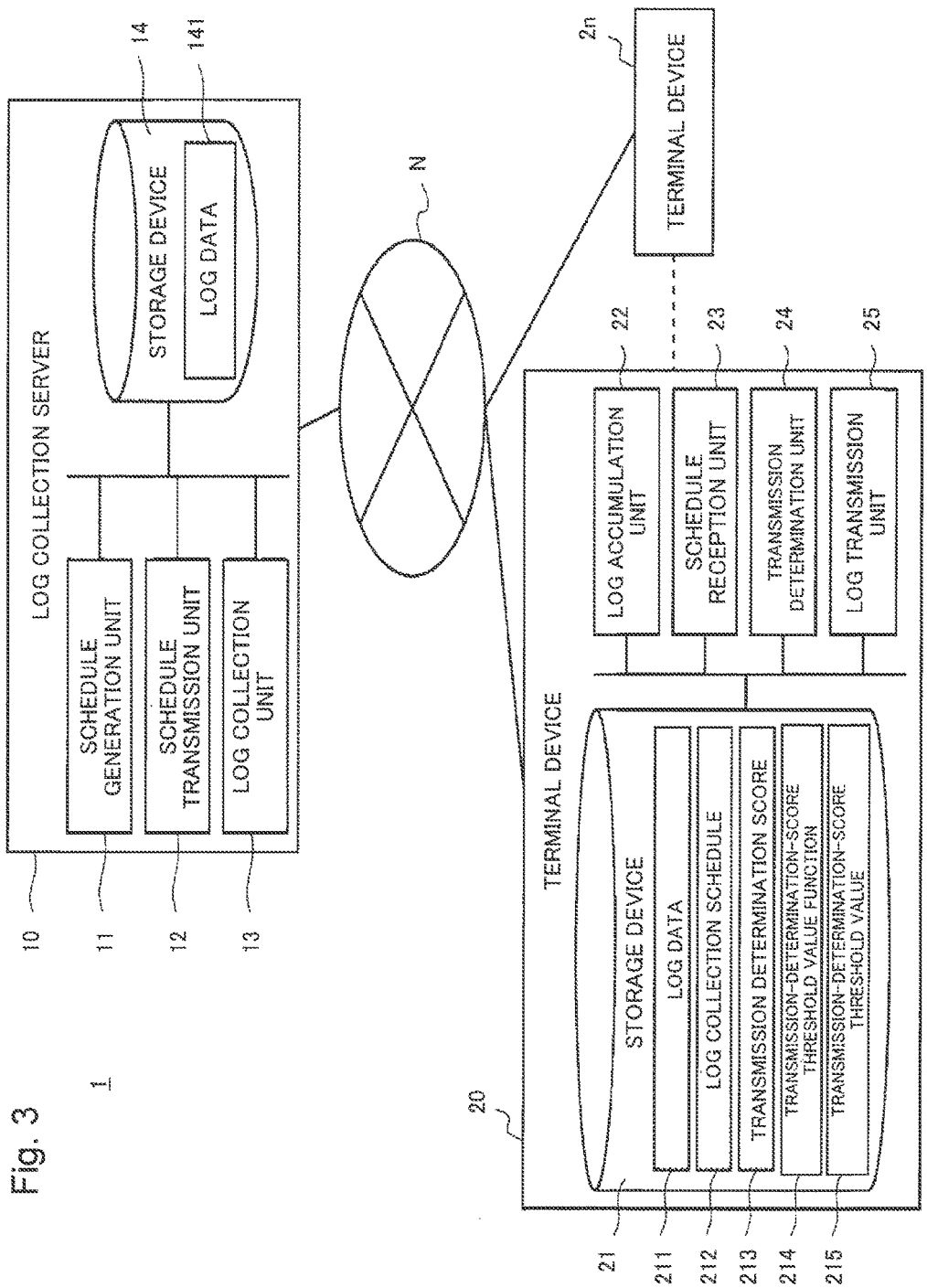
FIG. 3 is a block diagram illustrating a configuration of a log data collection system 1 according to an exemplary embodiment 2 of the present invention.

Further, FIG. 3 is a block diagram illustrating a configuration of a log data collection system 1 according to the exemplary embodiment 2 of the present invention. The log data collection system 1 includes one log collection server 10 and terminal devices 20, . . . , 2n. The log collection server 10 and the terminal devices 20, . . . , 2n are able to communicate with each other through a network N. The log data collection system 1 is an example of the aforementioned log data collection system 1000, the log collection server 10 is an example of the aforementioned collection device 100, and the terminal device 20 and the like are examples of the aforementioned terminal device 200.

The log collection server 10 includes a schedule generation unit 11, a schedule transmission unit 12, a log collection unit 13, and a storage device 14. The schedule generation unit 11 generates a log collection schedule with respect to each terminal device. The schedule generation unit 11 creates a log collection schedule for each terminal device, being a log collection target, based on, for example, a schedule generation operation by a system administrator. The log collection schedule includes the aforementioned permissible transmission period 2102. A generation method of the log collection schedule will be described later. The schedule transmission unit 12 transmits a log collection schedule, generated for each terminal device, to a corresponding terminal device. The log collection unit 13 receives log data transmitted from each terminal device, and stores the data into the storage device 14. The storage device 14 stores log data 141 received by the log collection unit 13.

The terminal device 20 includes a storage device 21, a log accumulation unit 22, a schedule reception unit 23, a transmission determination unit 24, and a log transmission unit 25. The storage device 21 stores log data 211, a log collection schedule 212, a transmission determination score 213, a transmission-determination-score threshold value function 214, and a transmission-determination-score threshold value 215. The log data 211 is equivalent to the aforementioned log data 2101. The log collection schedule 212 is generated for the terminal device 20 and transmitted, by the log collection server 10. The transmission determination score 213 is an example of an index value indicating a degree of suitability for transmission of log data at a present time. The transmission-determination-score threshold value 215 is an example of a threshold value for permitting transmission of log data at the present time. The transmission-determination-score threshold value function 214 is a predetermined function for calculating the transmission-determination-score threshold value 215, based on a present time.

The log accumulation unit 22 stores various data acquired on the terminal device 20 into the storage device 21 as the log data 211. The schedule reception unit 23 receives a log collection schedule transmitted from the log collection server 10, and stores the schedule into the storage device 21 as the log collection schedule 212. The transmission determination unit 24 determines a timing of transmitting the log data 211, stored in the storage device 21, to the log collection server 10. A determination method of a timing of transmitting log data will be described later. The log transmission unit 25 transmits the accumulated log data 211, at a timing determined by the transmission determination unit 24, to the log collection server 10.

Figure 4:
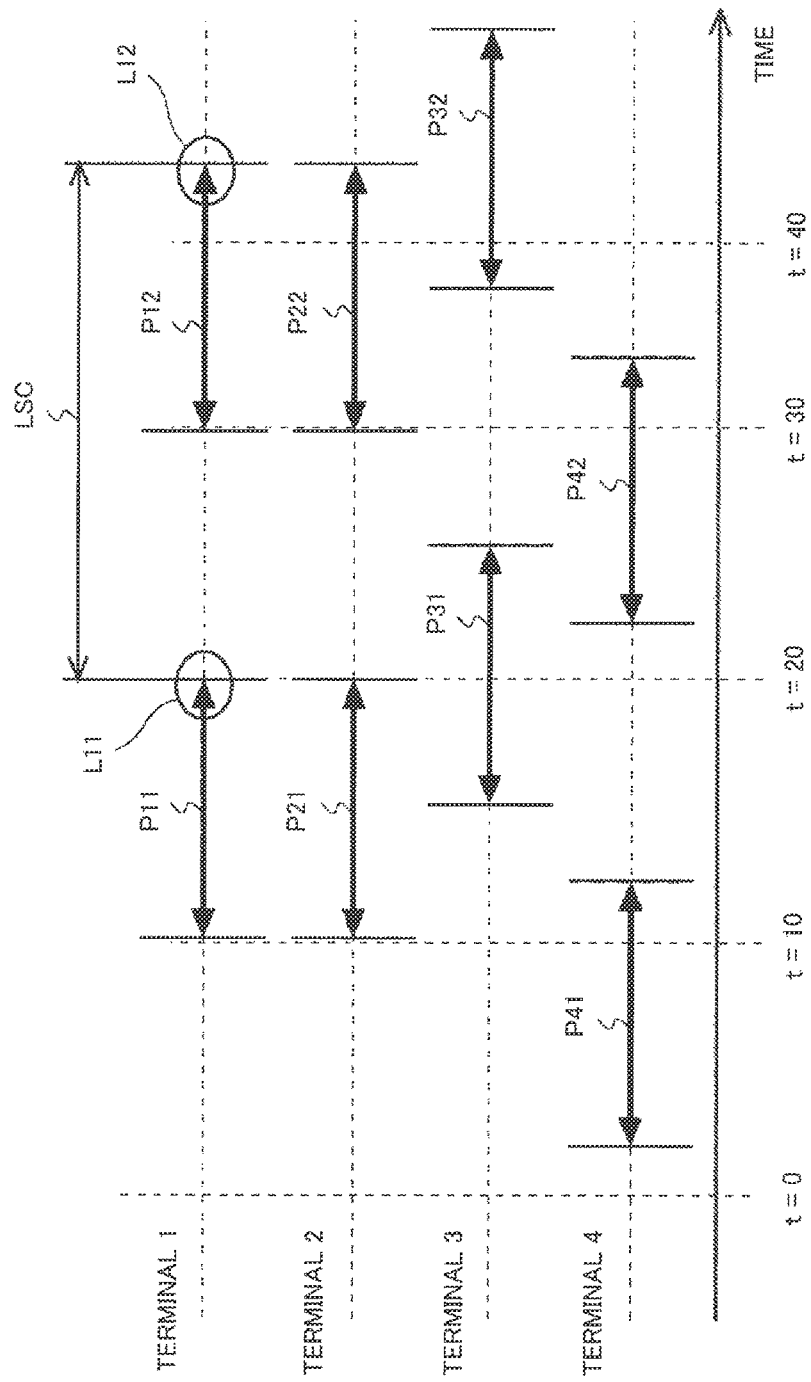
FIG. 4 is a diagram illustrating an example of a log collection schedule according to the exemplary embodiment 2 of the present invention.

FIG. 4 is a diagram illustrating an example of a log collection schedule according to the exemplary embodiment 2 of the present invention. A log collection schedule with respect to a terminal is represented as a permissible transmission period (a pair of a start time and a finish time), appearing periodically. FIG. 4 illustrates that permissible transmission periods P11 and P12 are set for a terminal 1, permissible transmission periods P21 and P22 for a terminal 2, permissible transmission periods P31 and P32 for a terminal 3, and permissible transmission periods P41 and P42 for a terminal 4.

A finish time of a permissible transmission period is particularly referred to as a log transmission time limit. In FIG. 4, a finish time of the permissible transmission period P11 is a log transmission time limit L11, and a finish time of the permissible transmission period P12 is a log transmission time limit L12.

Further, a cycle of a log transmission time limit with respect to a terminal is referred to as a log transmission cycle. In FIG. 4, a period from the log transmission time limit L11 to the log transmission time limit L12 corresponds to a log transmission cycle LSC at the terminal 1.

The schedule generation unit 11 creates a log collection schedule having a length matching a log transmission cycle. For example, when the log transmission cycle is one day (24 hours), a generated log collection schedule has a length of 24 hours in which a permissible transmission period with respect to each terminal device appears precisely once. Lengths of the log transmission cycle and the log collection schedule do not need to match, and, for example, a permissible transmission period with respect to each terminal device may appear three times within 24 hours of the log collection schedule. Thus, a permissible transmission period for each terminal can be set more flexibly and easily, compared with a case of matching lengths of the log transmission cycle and the log collection schedule. Further, the schedule generation unit 11 can be considered to calculate a permissible transmission period at a terminal device, based on a history of a network communication traffic other than communication of past log data, that is, background traffic. Further, the schedule generation unit 11 also calculates a plurality of permissible transmission periods by dispersing a time span, with respect to each of a plurality of terminal devices. Additionally, the log collection server 10 may monitor the terminal device 20 and the like to determine when each terminal device transmits locally-accumulated log data, and generate a log collection schedule.

An example of a determination method of a log transmission cycle is to synchronize with a cycle of an action performed by use of collected log data. For example, for a purpose of collecting a movement history of a terminal device as log data, and performing advertisement delivery based on the result once a day, a log transmission cycle is synchronized to the advertisement delivery cycle, being a day. The log transmission cycle does not need to be fixed, and may be variable.

Next an operation of each configuration will be described.

(1) Log collection server 10: Generation of a log collection schedule

Figure 5:
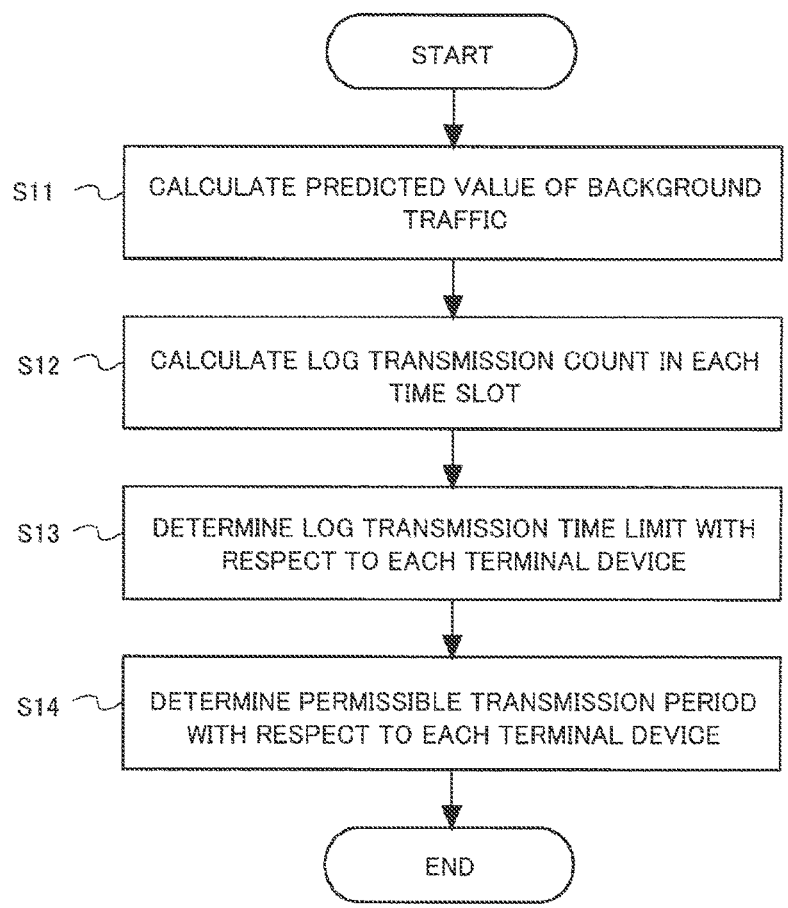
FIG. 5 is a flowchart illustrating a flow of generation processing of the log collection schedule according to the exemplary embodiment 2 of the present invention.

With reference to a flowchart in FIG. 5, procedures in generating of a log collection schedule by the schedule generation unit 11 in the log collection server 10 will be presented below. In procedures below, a time 0 represents a start time of a log collection schedule and a time slot represents a time elapsed from the time 0. While an example of a length of a time slot is one second, the length is not necessarily limited thereto. Further, in generation of a log collection schedule, an upper limit C of total communication traffic is determined in advance. A value of the upper limit C corresponds to an upper limit of a total amount of background traffic and log collection traffic in each time slot, and an example of a unit thereof is Gbit/sec.

Step S11: The schedule generation unit 11 calculates a predicted value Tr[t] of background traffic with respect to each time slot t within a range of a log transmission schedule (an example of a unit is Gbit/sec).

An example of a background traffic calculation unit is to let an average of past total traffic measurement values at a time equivalent to each time slot t be Tr[t], assuming that a range of the log transmission schedule is 24 hours.

Step S12: The schedule generation unit 11 calculates a permissible log transmission count N[t] in each time slot t by the following procedures (S22-1 to S22-3).

S22-1: The schedule generation unit 11 calculates permissible traffic Tr_max[t] in each time slot t by use of equation (1) below.

[Math. 1]

$$Tr\_max[t]=C-Tr[t] \quad \text{equation (1)}$$

It is assumed that Tr_max[t]=0 if Tr_max[t]<0.

S22-2: The schedule generation unit 11 calculates a total value, TrSum, of Tr_max[t] with respect to the entire time slots, by use of equation (2) below.

[Math. 2]

$$TrSum=\Sigma Tr\_max[t] \quad \text{equation (2)}$$

Then, by use of TrSum, the schedule generation unit 11 calculates a log transmission probability P[t] in each time slot t, by use of equation (3) below.

[Math. 3]

$$P[t]=Tr\_max[t]/\Sigma Tr\_max[t] \quad \text{equation (3)}$$

S22-3: The schedule generation unit 11 calculates a permissible log transmission count, with respect to a number of terminal devices $n$ and each time slot t, by use of equation (4) below.

[Math. 4]

$$N[t]=n \times P[t] \quad \text{equation (4)}$$

N[t] is set to an integer by any one of round-up, round-down, and round-off unit. Additionally, the schedule generation unit 11 may make a correction so that a total of N[t] with respect to the entire time slots matches the number of terminal devices n.

FIG. 6 illustrates an example of a calculation process of the permissible log transmission count N[t]. In this example, there are a total of six time slots, being t=0 to 5, and the number of terminal devices n =10. In Step S22-1, it is assumed that the calculation result of the permissible traffic Tr_max[t] is Tr_max[0]=50, Tr_max[1]=40, Tr_max[2]=20, . . . as indicated in the table. Consequently, the total value, TrSum, of Tr_max[t] with respect to the entire time slots can be calculated by use of equation (5) below.
[Math. 5]

$$TrSum = \Sigma Tr\_max[t] = 200 \qquad \text{equation (5)}$$

Consequently, in Step S22-2, P[0]=50/200=0.25, P[1]=40/200=0.2, P[2]=20/200=0.1, . . . are obtained. Furthermore, by use of the result and n=10, in Step S22-3, N[0]=10×0.25=2 (dropping the fractional portion), N[1]=10×0.2=2, N[2]=10×0.1=1, . . . are obtained as a result. Additionally, N[5]=3 is obtained by adding a correction of rounding up the result of N[5] so that a total value of N[t] matches equation (6) below.
[Math. 6]

$$\Sigma N[t] = n = 10 \qquad \text{equation (6)}$$

Step S13: The schedule generation unit 11 determines a log transmission time limit with respect to each terminal device so as to satisfy the permissible log transmission count N[t], being the calculation result of Step S12.

An example of a determination method of the log transmission time limit is to allocate an earlier time slot in ascending order of number assigned to each terminal device in advance.

With reference to FIG. 6 once again, an example of allocation of a log transmission time limit to a terminal device will be presented. In this example, 10 terminal devices are respectively assigned with numbers D1, D2, . . . , D10, and an earlier time slot is allocated in ascending order of the number. Consequently, each terminal device is allocated in accordance with a permissible log transmission count, being the result of Step S12, such as D1 and D2 to a time slot t=1, D3 and D4 to a time slot t=2.

Step S14: The schedule generation unit 11 determines a permissible transmission period with respect to each of the terminal devices 20 to 2n under the log collection server 10, based on the log transmission time limit determined in Step S13.

An example of a determination method of the permissible transmission period is to calculate a length of the permissible transmission period by multiplying a log transmission cycle by a constant value. For example, assuming that a log transmission cycle is 48 time slots and a coefficient is 0.1, a length of the permissible transmission period is obtained as 48×0.1=4 (time slots, dropping the fractional portion). In this case, assuming that a log transmission time limit with respect to a terminal device is the time slot t=10, the permissible transmission period is obtained as a range from the time slot 7 to the time slot 10.

(2) Log Collection Server 10: Transmission of a Log Collection Schedule

The schedule transmission unit 12 transmits a log collection schedule generated in (1) to each terminal device. As a delivery method of a log collection schedule, each terminal device may periodically acquire a log collection schedule from the log collection server 20, in addition to a method of transmission from the log collection server 20 to the terminal devices 20 to 2n.

(3) Terminal Device 20: Log Accumulation

Triggered by an event such as an application launch on the own terminal device and acquisition of positional information, the log accumulation unit 22 accumulates contents of the event as the log data 211, in the storage device 21 included in the terminal device.

An example of an event is measurement of a present position at regular intervals by use of a global positioning system (GPS) or the like. In this case, a set of a measurement time and positional information being a measurement result becomes log data. Another example of an event is specifying a user operation on a smart phone, such as an application launch and a screen transition, as an event, and a set of a time, an application name, and an operation name as log data. Note that log accumulation processing in (3) is independent of Log collection schedule generation processing in (1) and Log collection schedule transmission processing in (2), and there is no restriction on a chronological relation.

(4) Terminal Device 20: Determination of a Log Transmission Timing

The transmission determination unit 24 determines a timing of transmitting log data, accumulated in the terminal, within a range of the permissible transmission period determined in (1), to the log accumulation server. By performing the processing below at regular intervals (such as every second), whether or not to transmit log data at the time is determined.

Figure 7:
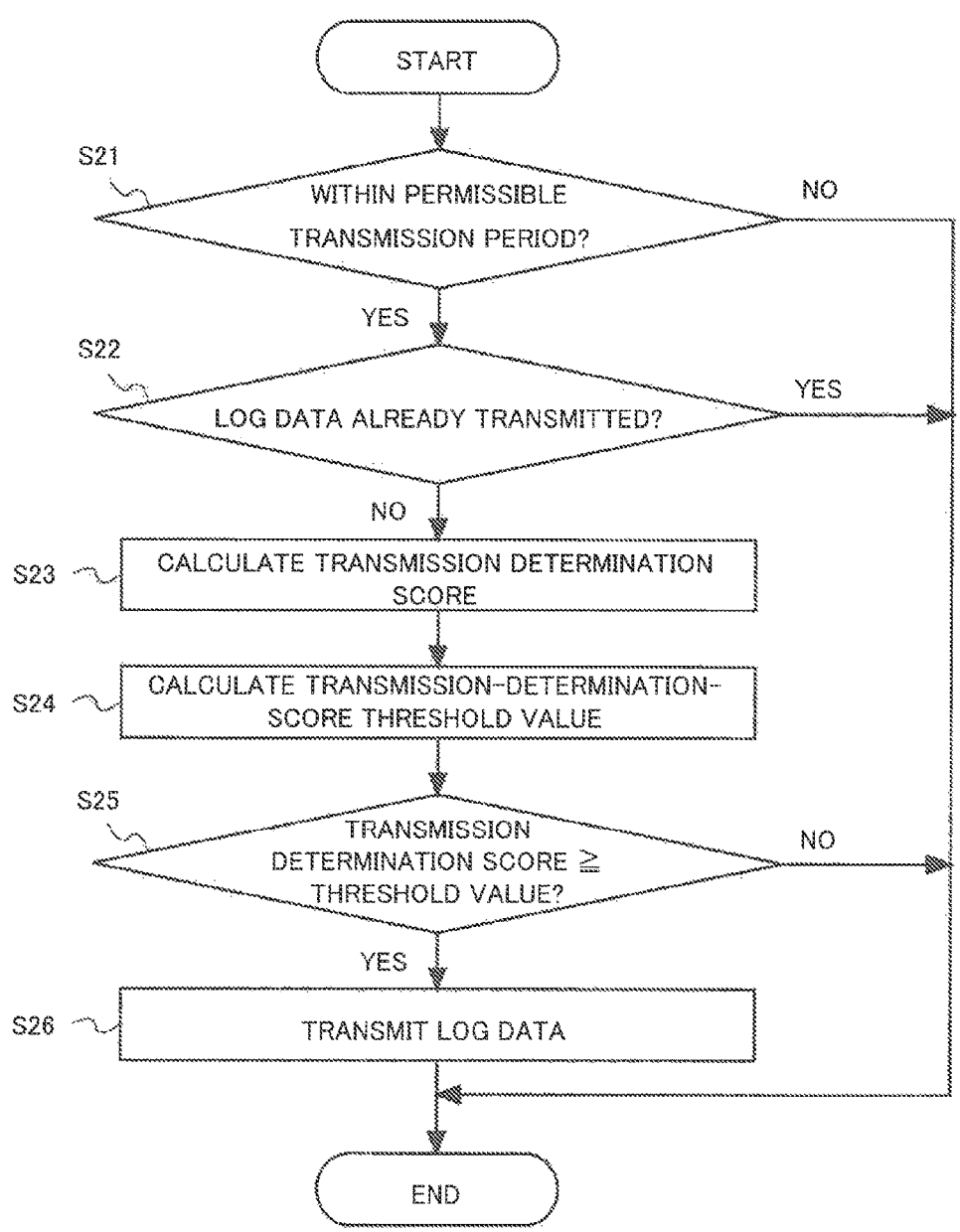
FIG. 7 is a flowchart illustrating a flow of determination processing of a log transmission timing according to the exemplary embodiment 2 of the present invention.

With reference to a flowchart in FIG. 7, determination procedures of a log transmission timing will be presented below.

Step S21: The transmission determination unit 24 checks whether a present time t is within a range of a permissible transmission period set to the terminal device. Specifically, the transmission determination unit 24 determines whether or not a present time t is within a range of a permissible transmission period, with reference to the log collection schedule 212 stored in the storage device 21. The transmission determination unit 24 proceeds to Step S22 when the time is within the permissible transmission period, and ends the processing otherwise.

Step S22: The transmission determination unit 24 checks whether log data are already transmitted within the present permissible transmission period. The transmission determination unit 24 proceeds to Step S23 when the data are not yet transmitted, and ends the processing when the data are already transmitted.

Step S23: The transmission determination unit 24 calculates a transmission determination score S[t] at a present time t. The transmission determination score S[t] is a numerical value quantifying a degree of suitability for data transmission at the time t, and is calculated from states of the terminal device and the network. In other words, the transmission determination unit 24 includes an index value calculation unit which calculates an index value indicating a degree of suitability for transmission of log data at a present time, based on a state of the terminal device 200 and a state of the network N.

An example of a calculation method of the transmission determination score S[t] will be presented below. In a case that a terminal device is connected to Wi-Fi, traffic to a mobile phone network is not generated, and therefore a higher score is assigned than a case that the device is connected to a mobile phone network. This can be considered that, in a case that communication through a plurality of lines is available, when the device is connected to a line (such as Wi-Fi) through which communication of the device is preferentially performed compared with another line, stable and, high-speed communication is available, and therefore a higher score is assigned.

Further, another round of connection establishment processing is not necessary within a certain period after the last communication (some data transmission/reception) by the terminal device, and therefore a score higher than that for other cases is assigned. This can be viewed as a state in which the terminal device 200 is ready for data communication.

Further, when the terminal device is currently in (some data) communication, the communication may decrease a transfer speed of another communication, and therefore a score lower than that for other cases is assigned.

An example of a specific calculation method of S[t] is as follows.

When a terminal is in Wi-Fi connection, add "10" to S[t].
When a time elapsed since the last communication by the terminal is less than or equal to five seconds, add "3" to S[t].
When the terminal is currently not in communication, add "1" to S[t].

Further, when the terminal device is able to acquire a network congestion state from a connected base station or the like, the state may be added to the transmission determination score. For example, a lower score may be assigned as the network congestion is heavier.

When log data are periodically collected, a battery at a terminal is consumed at every log data transmission, and therefore, in addition to the aforementioned problem, there is another problem that a battery usage time decreases. For example, as described in Technical Problem, when a terminal device is in the idle state, log data are transmitted after transition from the idle state to the active state (ST). At this time, although not being part of the log data transmission processing, battery consumption accompanying the state transition ST occurs.

By contrast, in calculation of the transmission determination score S[t] according to the exemplary embodiment of the present invention, when the terminal device 20 is in a state ready for data communication, a higher score is calculated. Therefore, the active state is more preferable for determining a transmission timing than the idle state in which a connection is not established, and thus battery consumption can be suppressed.

Step S24: The transmission determination unit 24 calculates value of a transmission-determination-score threshold function T[t] at a present time t. The transmission-determination-score threshold value function T[t] is a function having a value greater than 0 at a start time, being calculated to be less than a previous value as time elapses (a value of t becomes greater) in a permissible transmission period, and having a value T[t]=0 at a log transmission time limit. In other words, it is assumed that a value near a finish time is equivalent to or less than a value near a start time within a permissible transmission period. That is, the transmission-determination-score threshold value function T[t] can be considered as a function decreasing a value in response to increase of a time t. It is preferable that the transmission-determination-score threshold value function T[t] is given from outside the log data collection system in advance. Thus, in this Step S24, a value of the transmission-determination-score threshold value function T[t] at a present time t is calculated.

In other words, the transmission determination unit 24 includes a threshold value calculation unit which calculates a threshold value for permitting transmission of the log data at a present time. The threshold value calculation unit calculates a threshold value at a present time so as to decrease the threshold value from an initial threshold value at a start time of the permissible transmission period, in response to a time elapsed from the start time to the present time, and, when the present time is a finish time of the permissible transmission period, calculates the lowest index value as a threshold value at the present time. Additionally, it is desirable that the threshold value calculation unit performs calculation by decreasing a threshold value, as a present time elapses from the start time, at least in a partial time span in the permissible transmission period. Thus, a fine adjustment of a transmission timing is available.

Figure 8:
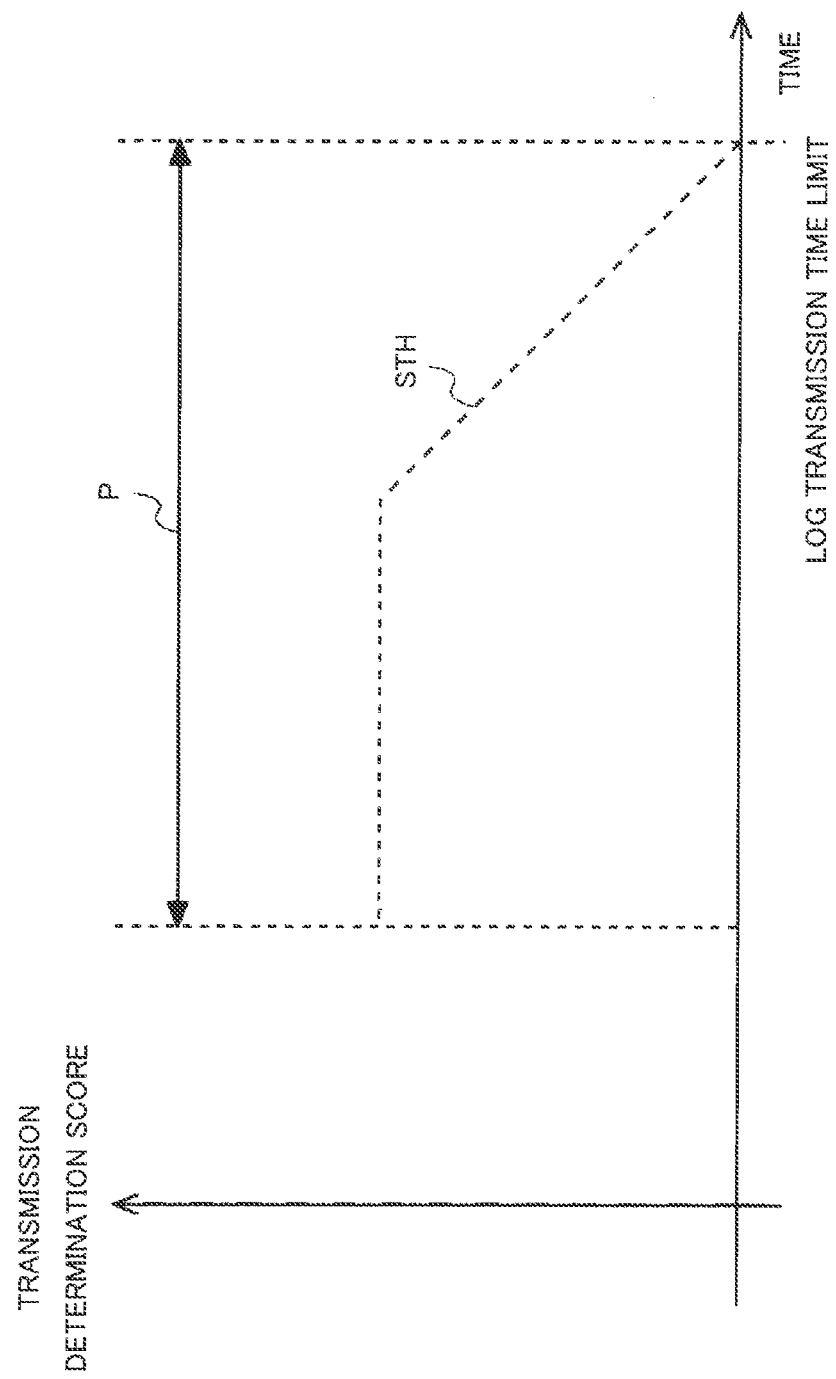
FIG. 8 is a diagram illustrating an example of a transmission-determination-score threshold value function according to the exemplary embodiment 2 of the present invention.
Figure 9:
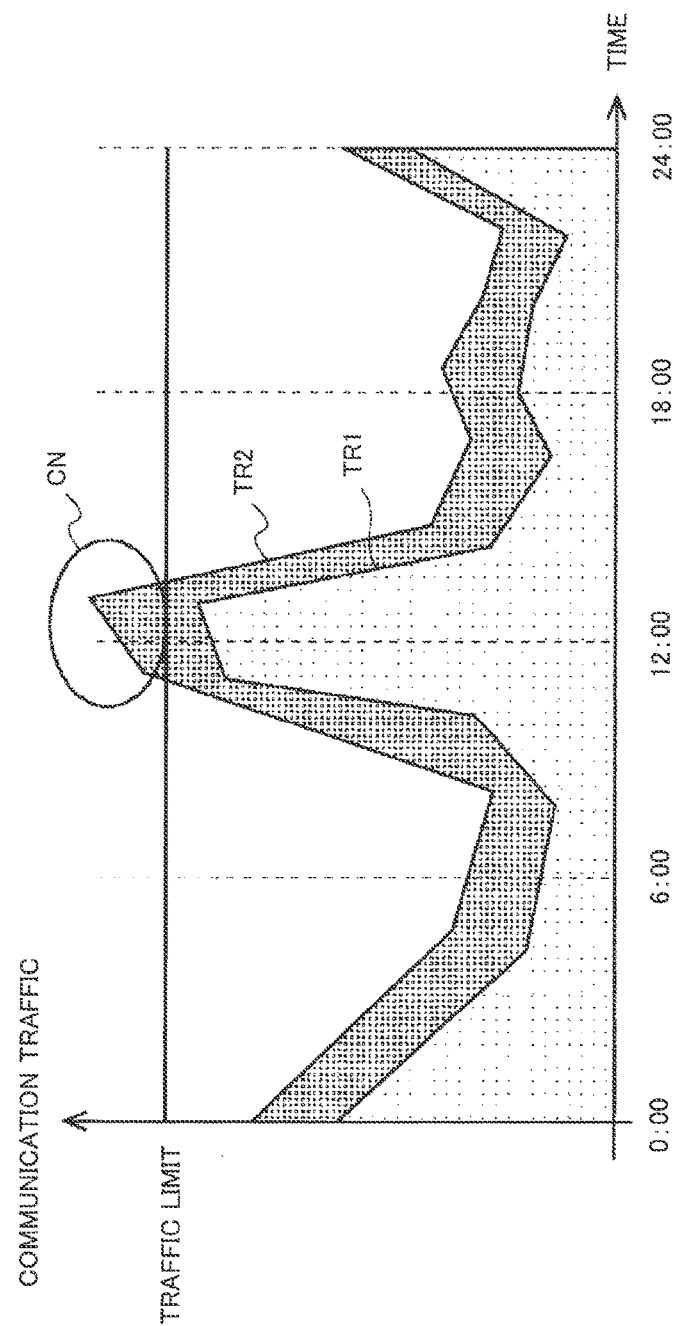
FIG. 9 is a diagram illustrating an example of background traffic and log data collection traffic.
Figure 10:
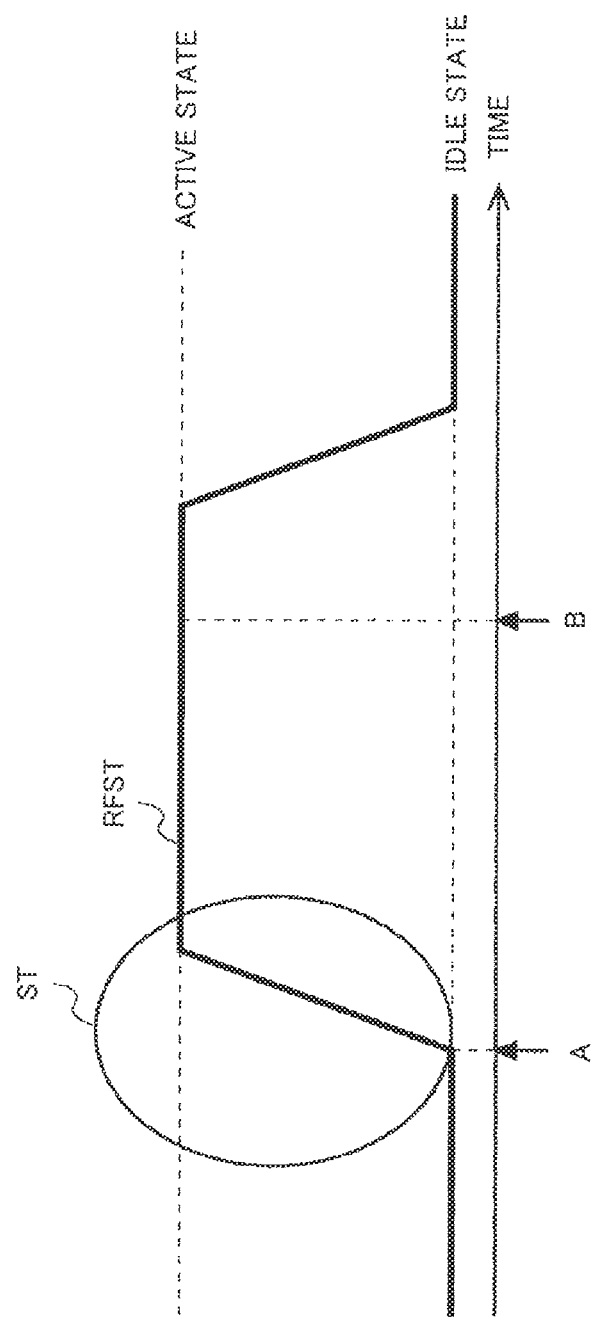
FIG. 10 is a diagram illustrating a relation between a state of a terminal device and state transition.

FIG. 8 illustrates an example of the transmission-determination-score threshold value function T[t]. It is assumed that a span between a start time t0 and a log transmission time limit t2 is set as a permissible transmission period P. It is further assumed that a transmission-determination-score threshold value STH in a span between the start time t0 and a time t1 is a constant value, the transmission-determination-score threshold value STH monotonically decreases in a span between the time t1 and the log transmission time limit t2, and the transmission-determination-score threshold value STH becomes 0 at the log transmission time limit t2. The time t1 may be set at any time at or after t0 and before t2.

Step S25: The transmission determination unit 24 compares value of the transmission determination score S[t], calculated in Step S23, with the transmission-determination-score threshold value STH, calculated in Step S24. The transmission determination unit 24 proceeds to Step S26 when valued of the transmission determination score S[t] is greater than or equal to the transmission-determination-score threshold value STH, and ends the processing otherwise.

Step S26: The transmission determination unit 24 transmits the log data, accumulated in the terminal device, to the log collection server, and ends the processing.

Next, a supplementary description will be provided on an effect of maintaining or decreasing a transmission-determination-score threshold value T, in response to time increase. As a constraint in determination of a log transmission timing, log transmission needs to be determined by the log transmission time limit. Further, in order to solve the problem by the present invention, log transmission needs to be determined at a time under a minimum network load possible.

When there is sufficient time before the log transmission time limit, log transmission can be put on hold until a more preferable condition (that is, with less background traffic and a communication state of the terminal being active) arrives, by setting the transmission-determination-score threshold value high. By contrast, when there is no sufficient time before the log transmission time limit, satisfying the constraint of the log transmission time limit needs to be given priority.

Consequently, an effect of minimizing a network load within the constraint of the log transmission time limit may be obtained, by gradually decreasing (or at least maintaining) the transmission-determination-score threshold value from an initial value to eventually 0, within the permissible transmission period.

Although the transmission-determination-score threshold value according to the present exemplary embodiment is presented in a form in which the value is maintained at a constant value up to a certain point, and gradually decreased linearly therefrom, the form is not necessarily limited thereto. The transmission-determination-score threshold value function T[t] may take another form such as a form of linearly decreasing values throughout the entire permissible transmission period, and a form of exponentially decreasing values. That is, for example, the function may simply decrease values from the start time t0 toward the log transmission time limit t2, without having the time t1, in the example in FIG. 8. Any function such as an exponential function may be applied to the function. Further, when the time t1 is set, the negative slope may be changed or the function may be changed at the time t1. Further, a plurality of intermediate times corresponding to the time t1 may be set. Further, the threshold value may reach 0 before the log transmission time limit t2, and be set to a constant value therefrom. Further, the function may take discontinuous values between the start time t0 and the log transmission time limit t2. In this case, the transmission-determination-score threshold value STH only needs to have a nonzero value at least at the start time t0, and therefrom have a value equivalent to or less than an immediately preceding value up to t2, as time elapses.

The transmission determination score S[t] and the transmission-determination-score threshold value T[t] do not need to have numerical values. For example, they only need to be expressed by level values such as A, B, and C, and be index values capable of distinguishing at least two levels such as high and low.

(5) Terminal Device 20: Log Transmission (Log Transmission Unit)

When transmission of log, accumulated in the terminal, is determined in (4), the log transmission unit 25 transmits the log data 211, accumulated at that point, to the log collection server 10, and erases the log data 211 from the storage device 21. The log may be compressed before transmission in order to reduce a data amount to be transmitted.

(6) Log Collection Server 10: Log Collection (Log Collection Unit)

The log collection unit 13 receives log data transmitted from the terminal device 20 in (5), and stores the data into the storage device 14 as the log data 141. When the log is received in a compressed state, the log is stored after being decompressed.

An example of an implementation method of the log transmission processing in (5) and the log reception processing in (6) is to operate a hypertext transfer protocol (HTTP) server on the log collection server 10, and to transmit log data from the terminal device 20 to the log collection server 10 in an HTTP POST method.

As described above, the exemplary embodiment of the present invention is able to create a log transmission schedule so as to transmit log data from more terminal devices in a time span in which lighter background traffic is predicted. In addition, a certain range is provided to a log transmission time from a terminal device, and, transmission may be preferentially performed when background traffic is light or the terminal device is in an active state. Thus, an effect of leveling out a network load accompanying log data collection, and suppressing battery consumption at a terminal device, is obtained.

<Exemplary Embodiment 3>

Figure 11:
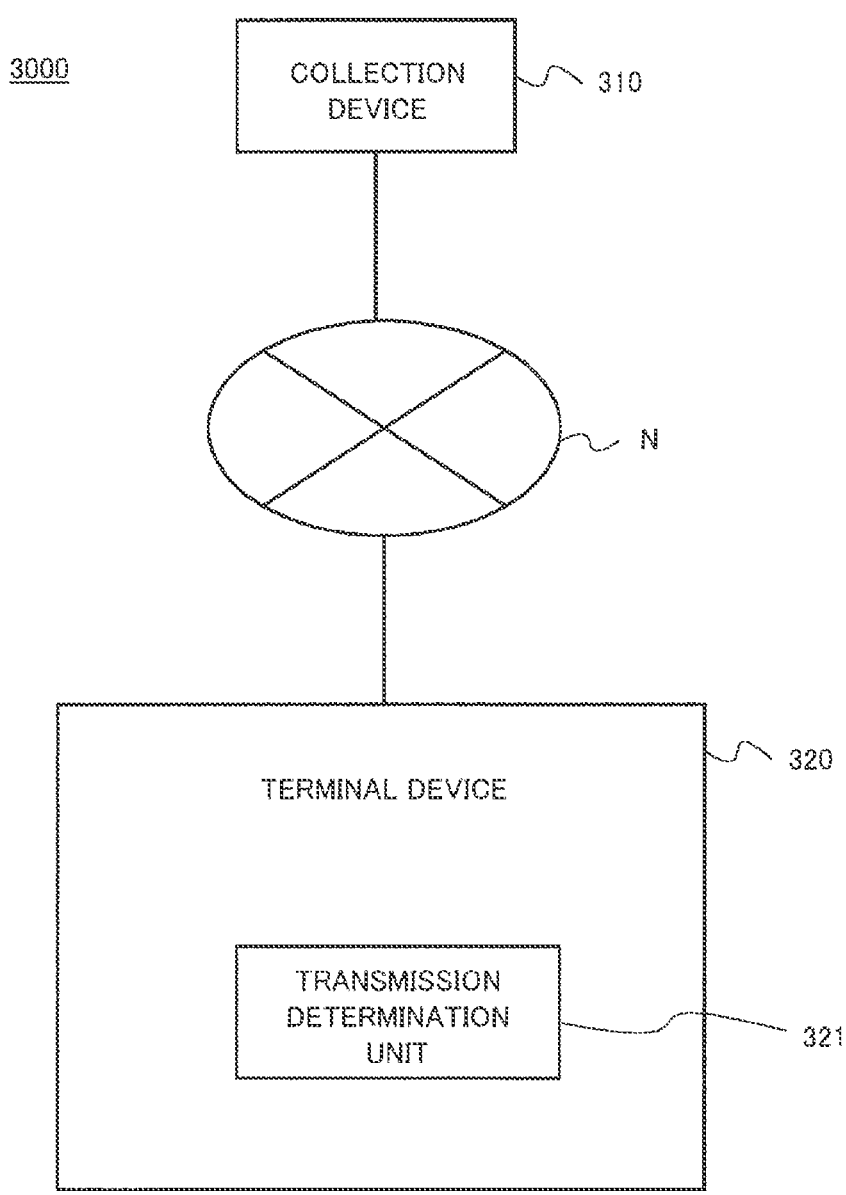
FIG. 11 is a block diagram illustrating an overall configuration of a log data collection system according to an exemplary embodiment 3 of the present invention.

An exemplary embodiment 3 according to the present invention represents a minimum configuration of a log data collection system according to the present invention. FIG. 11 is a block diagram illustrating an overall configuration of a log data collection system 3000 according to the exemplary embodiment 3 of the present invention. The log data collection system 3000 includes a terminal device 320 accumulating log data and a collection device 310 collecting log data from the terminal device 320 through a network N.

The terminal device 320 includes at least a transmission determination unit 321. The transmission determination unit 321 determines a timing of transmitting log data to the collection device 310, within a permissible transmission period, being a time span in which transmission of the log data is permitted, based on a state of the terminal device 320, a state of the network N, and a remaining time of the permissible transmission period.

Thus, the terminal device 320, first, is able to specify a transmission timing of log data within a range of a permissible transmission period having a certain time span range. Therefore, the log data collection system 3000 according to the exemplary embodiment 3 of the present invention is able to provide log data collection within a transmission time limit. Further, when determining a transmission timing of log data, the terminal device 320 takes into consideration a state of the terminal device 320, a state of the network N, and a remaining time of the permissible transmission period, at that point. Therefore, the log data collection system 3000 according to the exemplary embodiment 3 of the present invention is able to level out a network load accompanying the log data collection.

<Another Exemplary Embodiment>

Another exemplary embodiment of the present invention may be expressed as follows. A log collection schedule, permitting a certain temporal fluctuation, is created in advance with respect to each terminal device, based on a past measurement result of background traffic, and is delivered to each terminal device. Each terminal device transmits log data, accumulated in the terminal device, to a log collection server, in accordance with the log collection schedule. In order to determine a timing of transmitting log data, each terminal device calculates a degree of suitability for data transmission from states of the terminal device and the network, as a log transmission determination score, compares the score with a separately calculated log transmission-determination-score threshold value, and, when the former is greater than or equal to the latter, transmits the log data. By gradually bringing a log transmission-determination-score threshold value close to 0 within a permitted time in the log collection schedule, when there is sufficient time, a situation suitable for data transmission is selected and log transmission is performed. Thus, by determining a transmission timing of log data on the terminal device side, within a range permitted on the log collection server side, communication traffic and a load on a terminal device, accompanying log data collection, can be suppressed, and a temporal fluctuation of communication traffic can be leveled out.

Alternatively, the another exemplary embodiment of the present invention may be expressed as follows. In a log data collection system periodically collecting log data from a large number of terminal devices, a log data collection schedule is created, reflecting a past fluctuation of a network load, and a network load accompanying log data collection is leveled out by determining a timing of transmitting log data by each terminal device, based on the log data collection schedule and a terminal state and a network state during operation.

Furthermore, the another exemplary embodiment of the present invention may also be expressed as follows. A log data collection system is provided, characterized by including a log collection server and at least one terminal device, wherein the log collection server creates a log transmission schedule assigning a log transmission time limit to each terminal device so that a total amount of network traffic is leveled out with respect to each terminal device, based on a past measurement result of background traffic, and delivers the result to each terminal device, and each terminal device transmits log data, accumulated in the terminal device, to the log collection server, within a range observing a log transmission time limit assigned to the terminal device, at a timing of a log transmission determination score, calculated in accordance with states of the terminal and the network, being greater than or equal to a separately calculated log transmission-determination-score threshold value.

The log collection server 10 according to the exemplary embodiment 2 of the present invention may be applied to a log collection server collecting log data accumulated on a smart phone, such as a user operation history and a sensor measurement result, through a wireless network. Alternatively, the log collection server 10 may be applied to an information collection server for a sensor network or a machine-to-machine (M2M) network, collecting a measurement result from a sensor device through a wireless network.

Furthermore, the present invention is not limited to the aforementioned exemplary embodiments, and it goes without saying that various modifications may be made within the scope of the present invention already described. For example, although the present invention is described as a hardware configuration in the aforementioned exemplary embodiments, the present invention is not limited thereto. The present invention may provide any processing by causing a central processing unit (CPU) to execute a computer program. In this case, the computer program may be stored by use of various types of non-transitory computer-readable media and provided to the computer.

A non-transitory computer-readable medium includes various types of tangible storage media. An example of a non-transitory computer-readable medium includes a magnetic storage medium (such as a flexible disk, a magnetic tape, and a hard disk drive), a magneto-optical storage medium (such as a magneto-optical disk), a compact disk read only memory (CD-ROM), a CD-R, a CD-R/W, a digital versatile disc (DVD), a Blu-ray (registered trademark) Disc (BD), and a semiconductor memory (such as a mask ROM, a programmable ROM [PROM], an erasable PROM [EPROM], a flash ROM, and a random access memory [RAM]). Further, the computer program may be provided to the computer by various types of transitory computer-readable media. An example of a transitory computer-readable medium includes an electric signal, an optical signal, and an electromagnetic wave. A transitory computer-readable medium is capable of providing the program to the computer through a wired communication channel, such as an electric cable and an optical fiber, or a wireless communication channel.

The present invention is not limited to the aforementioned exemplary embodiments, and may be modified as appropriate within the scope of the present invention. Furthermore, the aforementioned exemplary embodiments may also be described in part or in whole as the following Supplementary Notes but are not limited thereto.

(Supplementary Note 1)

A log data collection system including:

a terminal device accumulating log data; and a collection device collecting the log data from the terminal device through a network, wherein the terminal device includes transmission determination unit which determines a timing of transmitting the log data to the collection device, within a permissible transmission period, being a time span in which transmission of the log data is permitted, based on a state of the terminal device, a state of the network, and a remaining time of the permissible transmission period.

(Supplementary Note 2)

The log data collection system according to Supplementary Note 1, wherein the transmission determination unit, in the permissible transmission period, determines a timing of transmitting the log data to the collection device, by giving higher priority to communication of data other than the log data, through the network, as a present time is closer to a start time of the permissible transmission period, and giving higher priority to transmission of the log data to the collection device, as the present time is closer to a finish time of the permissible transmission period.

(Supplementary Note 3)

The log data collection system according to Supplementary Note 1 or 2, wherein the transmission determination unit includes:

index value calculation unit which calculates an index value indicating a degree of suitability for transmission of the log data at a present time, based on a state of the terminal device and a state of the network; and threshold value calculation unit which calculates a threshold value for permitting transmission of the log data at the present time, the terminal device further includes log transmission unit which transmits the accumulated log data to the collection device, when the index value is greater than or equal to the threshold value, and the threshold value calculation unit:

calculates the threshold value at the present time so as to, in response to a time elapsed from a start time of the permissible transmission period to the present time, decrease the threshold value from an initial value of the threshold value at the start time; and, when the present time is a finish time of the permissible transmission period, calculates a lowest value of the index value as the threshold value at the present time.

(Supplementary Note 4)

The log data collection system according to Supplementary Note 3, wherein the threshold value calculation unit performs calculation by decreasing the threshold value as the present time elapses from the start time, at least in a partial time span in the permissible transmission period.

(Supplementary Note 5)

The log data collection system according to any one of claims 1 to 4, wherein a state of the terminal device includes a type of a connection line, through which the terminal device is connected to the network, and a state of establishment of a connection with the network.

(Supplementary Note 6)

The log data collection system according to any one of Supplementary Notes 1 to 5, wherein the permissible transmission period is determined based on a communication traffic history of the network.

(Supplementary Note 7)

The log data collection system according to any one of Supplementary Notes 1 to 6, wherein the collection device:

calculates the permissible transmission period at the terminal device, based on a communication traffic history of the network, excluding a communication traffic related to transmission of the log data in the past; and transmits the calculated permissible transmission period to the terminal device, and the terminal device determines a timing of transmitting the log data to the collection device by the transmission determination unit, based on the permissible transmission period received from the collection device.

(Supplementary Note 8)

A terminal device including:

storage unit which stores log data and a permissible transmission period, being a time span in which transmission of the log data is permitted; and transmission determination unit which determines a timing of transmitting the log data to a collection device connected through a network, within the permissible transmission period, based on an own state, a state of the network, and a remaining time of the permissible transmission period.

(Supplementary Note 9)

A log data collection method for collecting log data, by use of a terminal device accumulating the log data and a collection device connected to the terminal device through a network, the method including, by the terminal device:

determining a timing of transmitting the log data, within a permissible transmission period, being a time span in which transmission of the log data is permitted, based on a state of the terminal device, a state of the network, and a remaining time of the permissible transmission period; and transmitting the log data to the collection device at the determined timing.

(Supplementary Note 10)

A non-transitory computer-readable medium storing a program causing a computer to perform:

transmission determination processing of determining a timing of transmitting log data, within a permissible transmission period, being a time span in which transmission of the log data, accumulated locally, is permitted, based on an own state, a state of a network, and a remaining time of the permissible transmission period; and transmission processing of transmitting the log data to a collection device connected through the network, at the determined timing.

(Supplementary Note 11)

The log data collection system according to any one of Supplementary Notes 1 to 7 including a terminal device group including the terminal device and another terminal device, wherein the collection device:

calculates a plurality of the permissible transmission periods by dispersing a time span for each terminal device included in the terminal device group, based on a communication traffic history of the network; and transmits the calculated permissible transmission periods to corresponding terminal devices, respectively, and each terminal device determines a timing of transmitting the log data to the collection device by the transmission determination unit, based on the permissible transmission period received from the collection device.

While the present invention has been described above with reference to the exemplary embodiments, the present invention is not limited to the aforementioned description. Various changes and modifications that can be understood by those skilled in the art may be made to the configurations and details of the present invention, within the scope of the present invention.

This application claims priority based on Japanese Patent Application No. 2014-4920 filed on Jan. 15, 2014, the disclosure of which is hereby incorporated by reference thereto in its entirety.

REFERENCE SIGNS LIST

1000 Log data collection system
100 Collection device
200 Terminal device
210 Storage unit
2101 Log data
2102 Permissible transmission period
220 Transmission determination unit
1 Log data collection system
10 Log collection server
11 Schedule generation unit
12 Schedule transmission unit
13 Log collection unit
14 Storage device
141 Log data
20 Terminal device
21 Storage device
211 Log data
212 Log collection schedule
213 Transmission determination score
214 Transmission-determination-score threshold value function
215 Transmission-determination-score threshold value
22 Log accumulation unit
23 Schedule reception unit
24 Transmission determination unit
25 Log transmission unit
2n Terminal device
N Network
LSC Log transmission cycle
P11 Permissible transmission period
P12 Permissible transmission period
P21 Permissible transmission period
P22 Permissible transmission period
P31 Permissible transmission period
P32 Permissible transmission period
P41 Permissible transmission period
P42 Permissible transmission period
L11 Log transmission time limit
L12 Log transmission time limit
t0 Start time
t1 Time
t2 Log transmission time limit
TR1 Communication traffic (background traffic+log data collection traffic)
TR2 Background traffic
CN Congestion
TRL Traffic limit
RFST Wireless state
ST State transition
P Permissible transmission period
STH Transmission-determination-score threshold value
3000 Log data collection system
310 Collection device
320 Terminal device
321 Transmission determination unit

The invention claimed is:

1. A log data collection system comprising:
a terminal device accumulating log data; and
a collection device collecting the log data from the terminal device through a network, wherein
the terminal device includes;
a memory storing instructions; and
at least one processor configured to process the instructions to:
determine a timing of transmitting the log data to the collection device, within a permissible transmission period, being a time span in which transmission of the log data is permitted, based on a state of the terminal device, a state of the network, and a remaining time of the permissible transmission period;

calculate an index value indicating a degree of suitability for transmission of the log data at a present time, based on the state of the terminal device and the state of the network;

calculate a threshold value for permitting transmission of the log data at the present time; and transmit the accumulated log data to the collection device, when the index value is greater than or equal to the threshold value;

wherein calculate the threshold value further comprises:

calculate the threshold value at the present time to, in response to a time elapsed from a start time of the permissible transmission period to the present time, decrease the threshold value from an initial value of the threshold value at the start time; and when the present time is a finish time of the permissible transmission period, calculate a lowest value of the index value as the threshold value at the present time.

2. The log data collection system according to claim 1, wherein the terminal device, in the permissible transmission period, determines the timing of transmitting the log data to the collection device, by giving higher priority to communication of data other than the log data, through the network, as the present time is closer to the start time of the permissible transmission period, and giving higher priority to transmission of the log data to the collection device, as the present time is closer to the finish time of the permissible transmission period.

3. The log data collection system according to cam 1, wherein the terminal device performs calculation by decreasing the threshold value as the present time elapses from the start time, at least in a partial time span in the permissible transmission period.

4. The log data collection system according to cam 1, wherein the state of the terminal device includes a type of a connection line, through which the terminal device is connected to the network, and a state of establishment of a connection with the network.

5. The log data collection system according to claim 1, wherein the permissible transmission period is determined based on a communication traffic history of the network.

6. The log data collection system according to claim 1, wherein the collection device;

calculates the permissible transmission period at the terminal device, based on a communication traffic history of the network, excluding a communication traffic related to transmission of the log data in the past; and transmits the calculated permissible transmission period to the terminal device], and the terminal device: further determines a timing of transmitting the log data to the collection device, based on the permissible transmission period received from the collection device.

7. A terminal device comprising:

a storage device which stores log data and a permissible transmission period, being a time span in which transmission of the log data is permitted; and at least one processor configured to:

determine a timing of transmitting the log data to a collection device connected through a network, within the permissible transmission period, based on an own state, a state of the network, and a remaining time of the permissible transmission period;

calculate an index value indicating a degree of suitability for transmission of the log data at a present time, based on the state of the terminal device and the state of the network;

calculate a threshold value for permitting transmission of the log data at the present time; and transmit the accumulated log data to the collection device, when the index value is greater than or equal to the threshold value;

wherein calculate the threshold value further comprises:

calculate the threshold value at the present time to, in response to a time elapsed from a start time of the permissible transmission period to the present time, decrease the threshold value from an initial value of the threshold value at the start time; and when the present time is a finish time of the permissible transmission period, calculate a lowest value of the index value as the threshold value at the present time.

8. A log data collection method for collecting loo data, by use of a terminal device accumulating the log data and a collection device connected to the terminal device through a network, the method comprising, by the terminal device:

determining a timing of transmitting the log data, within a permissible transmission period, being a time span in which transmission of the log data is permitted, based on a state of the terminal device, a state of the network, and a remaining time of the permissible transmission period;

calculating an index value indicating a degree of suitability for transmission of the log data at a present time, based on the state of the terminal device and the state of the network;

calculating a threshold value for permitting transmission of the log data at the present time; and transmitting the accumulated log data to the collection device, when the index value is greater than or equal to the threshold value;

wherein calculating the threshold value further comprises:

calculating the threshold value at the present time to, in response to a time elapsed from a start time of the permissible transmission period to the present time, decrease the threshold value from an initial value of the threshold value at the start time; and when the present time is a finish time of the permissible transmission period, calculating a lowest value of the index value as the threshold value at the present time.

9. A non-transitory computer-readable medium storing a program, causing a computer to perform a method comprising:

determining a timing of transmitting log data, within a permissible transmission period, being a time span in which transmission of the log data, accumulated locally, is permitted, based on an own state, a state of a network, and a remaining time of the permissible transmission period;

calculating an index value indicating a degree of suitability for transmission of the log data at a present time, based on the state of the terminal device and the state of the network;

calculating a threshold value for permitting transmission of the log data at the present time; and transmitting the accumulated log data to the collection device, when the index value is greater than or equal to the threshold value:

wherein calculating the threshold value further comprises:

calculating the threshold value at the present time to, in response to a time elapsed from a start time of the permissible transmission period to the present time, decrease the threshold value from an initial value of the threshold value at the start time; and when the present time is a finish time of the permissible transmission period, calculating a lowest value of the index value as the threshold value at the present time.

* * * * *